United States Patent [19]

Brearley

[11] 4,025,781

[45] May 24, 1977

[54] BRAKE PRESSURE FAILURE CIRCUIT FOR MULTI-LINE BRAKE SYSTEMS

[75] Inventor: Malcolm Brearley, Solihull, England

[73] Assignee: Girling Limited, England

[22] Filed: Sept. 2, 1975

[21] Appl. No.: 609,667

[30] Foreign Application Priority Data

Sept. 5, 1974 United Kingdom ............ 38802/74

[52] U.S. Cl. .................. 340/52 C; 180/103 BF; 188/1 A; 340/240

[51] Int. Cl.$^2$ ......................................... B60Q 1/00

[58] Field of Search ............ 340/52 A, 240, 52 C; 188/1 A, 151 A; 180/103 BF

[56] References Cited

UNITED STATES PATENTS

| | | | |
|---|---|---|---|
| 2,815,502 | 12/1957 | Zeller | 340/52 C |
| 3,439,322 | 4/1969 | Gardner | 340/52 C |
| 3,828,308 | 8/1974 | Kobayashi | 340/52 C |
| 3,887,899 | 6/1975 | Kawaguchi et al. | 188/1 A |

*Primary Examiner*—Glen R. Swann, III
*Attorney, Agent, or Firm*—Kane, Dalsimer, Kane, Sullivan and Kurucz

[57] ABSTRACT

A brake pressure failure warning circuit for a multi-line brake system includes a plurality of pressure switches sensitive to the fluid pressure in the respective lines and each actuable when the pressure in the associated line reaches a predetermined value, a detecting circuit connected to the switches and arranged to produce an output signal when any of the switches are actuated, a muting circuit arranged to prevent the detecting circuit's producing an output signal when all of the switches are actuated and warning means operable by said output signal.

10 Claims, 2 Drawing Figures

BRAKE PRESSURE FAILURE CIRCUIT FOR MULTI-LINE BRAKE SYSTEMS

SUMMARY OF THE INVENTION

This invention relates to a brake pressure warning circuit for a multi-line brake system and has as an object to provide a warning circuit which will produce a warning signal when fluid pressure in any of the pressure lines fails to attain a predetermined level on operation of the brakes.

A brake pressure failure warning circuit in accordance with the invention comprises a plurality of pressure switches sensitive to the fluid pressures in the respective pressure lines and each actuable when the fluid pressure in the associated line attains a predetermined level, a detecting circuit connected to said switches and arranged to produce an output signal when any one of said switches is actuated, a muting circuit also connected to said switches and arranged to prevent the detecting circuit from producing its output signal when all of the switches are actuated and warning means operable by said output signal.

Preferably said warning means includes a latch circuit such that after receipt of said output signal the warning means can only be prevented from operating by disconnection thereof from its power supply.

The warning means may include a delay circuit at its input to prevent operation of the warning means by short duration output signals which may occur, for example, as a result of the fluid pressure in the various lines reaching said predetermined level at different instants after operation of the brakes.

Where the circuit is to be employed in an anti-slip braking system where the pressures in the brake lines may be relieved independently, the muting circuit may have additional input terminals for connection to a wheel slip control device to prevent the detector circuit producing an output whenever said control device is brought into operation.

BRIEF DESCRIPTION OF THE DRAWINGS

In the accompanying drawings

DETAILED DESCRIPTION

Figure 1:
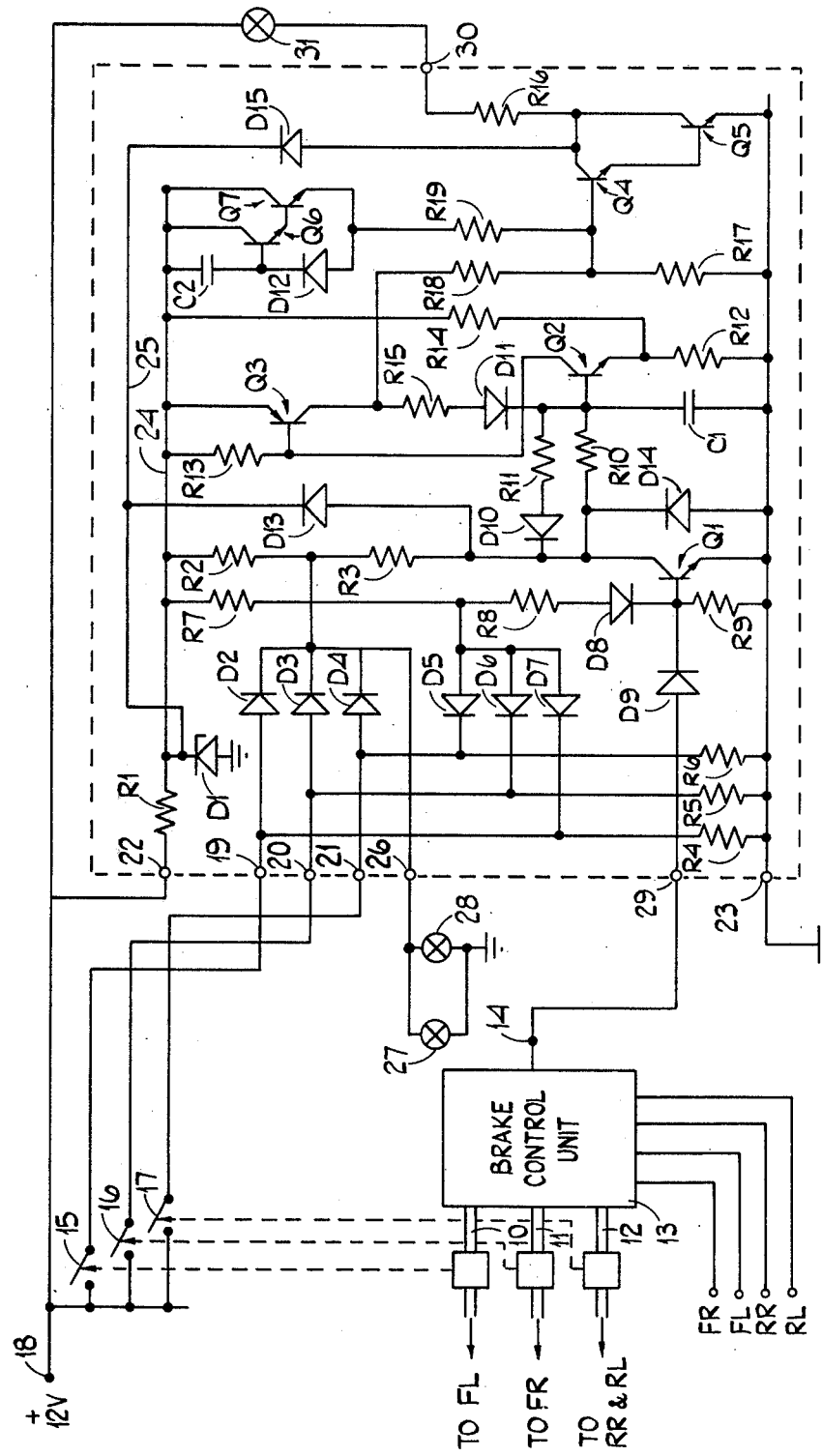
FIG. 1 is a circuit diagram of one example of a warning circuit in accordance with the invention, associated with a standard hydraulic braking system

The brake system to which the example described with reference to FIG. 1 is applied is one which employs three separate fluid pressure brake lines 10, 11 and 12 for the brakes which operate the left front wheel, the right front wheel and the two rear wheels. A brake control unit 13 receives speed signals from the various wheels and can operate, in known manner, to relieve the pressure in any of the lines 10, 11, 12 when an associated wheel is decelerating too rapidly. The unit 13 has an output terminal 14 at which a positive going output signal appears whenever the control unit 13 operates to relieve the pressure in any of the lines 10, 11, 12.

There are three normally open pressure switches 15, 16, 17 sensitive to the fluid pressures in the three lines 10, 11 and 12. Each switch is closed when the pressure in the associated line attains a predetermined value. The switches connect a positive voltage power supply terminal 18 to three input terminals 19, 20, 21 of the warning circuit.

The warning circuit has power supply terminals 22, 23 for connection to the terminal 18 and to the negative battery terminal respectively. A zener diode surge suppressor comprising a resistor $R_1$ connecting the terminal 22 to the cathode of a zener diode $D_1$ with its anode grounded (to terminal 23) provides, on rails 24 and 25 which are connected to the cathode of the zener diode $D_1$, a voltage from which surges have been removed.

The three input terminals 19, 20 and 21 are connected to the anodes of three diodes $D_2$, $D_3$ and $D_4$ which have their cathodes connected together and to a brake light output terminal 26 connected to the exterior brake lamps 27, 28. The cathodes of the diodes $D_2$, $D_3$ and $D_4$ are also connected by a resistor $R_2$ to the rail 24 and by a resistor $R_3$ to the collector of an n-p-n transistor $Q_1$, the emitter of which is connected to the terminal 23. The diodes $D_2$, $D_3$ and $D_4$ and the resistors $R_2$ and $R_3$ form a detector circuit such that a positive going output signal will appear at the collector of the transistor $Q_1$ (provided that this is non-conductive at the time) whenever any of the switches 15, 16 and 17 is closed. The value of the resistor $R_2$ is such that the lamps 27, 28 do not light except when at least one of the switches 15, 16 and 17 is closed.

The terminals 19, 20 and 21 are connected to the terminal 22 by three resistors $R_4$, $R_5$ and $R_6$ and to the cathodes of three diodes $D_5$, $D_6$ and $D_7$, the anodes of which are connected together. The anodes of diodes $D_5$, $D_6$ and $D_7$ are connected by a resistor $R_7$ to the rail 24 and by a resistor $R_8$ to the anode of a diode $D_8$. The cathode of the diode $D_8$ is connected to the base of the transistor $Q_1$ which is also connected by a resistor $R_9$ to the terminal 23. A further diode $D_9$ has its cathode connected to the base of the transistor $Q_1$ and its anode connected to a terminal 29 of the circuit connected to the terminal 14 of the unit 13. The transistor $Q_1$, the resistors $R_4$ to $R_9$, and the diodes $D_5$ to $D_9$ form a muting circuit which prevents an output signal being produced by the detector circuit either when all three switches 15, 16 and 17 are closed, or when there is a positive going output signal at the terminal 14 of the unit 13. In this connection and provided the transistor Q1 is not conductive, any signal arriving via the diodes D2, D3 or D4 will be passed on via the resistor R3 and the resistor R10 to the base of the transistor Q2. The bias circuit for the transistor Q1 includes the resistor R7 which is connected to the anodes of the three diodes D5, D6 and D7, each of which is connected to the ground rail by an associated resistor R4, R5 or R6. If any one of the switches 15, 16 or 17 is open the associated diode D5, D6 or D7 will provide a path to divert current passing through the resistor R7 away from the base of the transistor Q1. If all three switches 15, 16 and 17 are closed then there is no path which the R7 current can take except through the resistors R8 and R9 to bias the transistor Q1 on. In these circumstances, the junction of the resistors R3 and R10 goes down to a low voltage and the transistor Q2 is not turned on by the signal passing forward from the switches via the diodes D2, D3 or D4. Similarly the brake control unit 13 also produces a positive going output at its terminal 14, whenever a skid condition arises and this positive going signal turns on the transistor Q1 via the diode D9.

The collector of the transistor $Q_1$ is connected by a resistor $R_{10}$ to the base of an n-p-n transistor $Q_2$. A capacitor $C_1$ is connected between the base of the transistor $Q_2$ and the terminal 23 so as to form, in combination with the resistor $R_{10}$ a delay circuit to delay the rise in voltage at the base of transistor $Q_2$ after an output signal has appeared at the collector of transistor $Q_1$. For discharging the capacitor $C_1$ a resistor $R_{11}$ of ohmic value lower than that of the resistor $R_{10}$ is connected between the base of the transistor $Q_2$ and the anode of a diode $D_{10}$ the cathode of which is connected to the collector of the transistor $Q_1$. Thus the capacitor $C_1$ is discharged relatively rapidly whenever the transistor $Q_1$ becomes conductive.

The emitter of the transistor $Q_2$ is connected to the terminal 23 by a resistor $R_{12}$ and to the rail 24 by a resistor $R_{14}$ and its collector is connected to the rail 24 by a resistor $R_{13}$. A p-n-p transistor $Q_3$ has its emitter connected to the rail 24 and its base connected to the collector of the transistor $Q_2$. The collector of the transistor $Q_3$ is connected by a resistor $R_{15}$ to the anode of a diode $D_{11}$ the cathode of which is connected to the base of the transistor $Q_2$. Normally both transistors $Q_2$ and $Q_3$ are off. If, however, the detector circuit produces an output signal for a sufficient time for the capacitor $C_1$ to become charged to a voltage higher than that existing at the emitter of the transistor $Q_2$ as a result of the resistors $R_{12}$ and $R_{14}$, the transistor $Q_2$ will start to conduct. Current flowing through resistor $R_{13}$ will now cause the transistor $Q_3$ to start to conduct to supply additional base current to the transistor $Q_2$ and a regenerative switching action occurs causing both transistors $Q_1$ and $Q_2$ to be rendered fully conductive. Removal of the output signal of the detector will not switch the transistors off since sufficient current is supplied to the base of the transistor $Q_2$ by the transistor $Q_3$. The transistors $Q_2$ and $Q_3$ thus form a latch circuit which can only be switched off by disconnecting the circuit from the power supply.

The latch circuit referred to controls a lamp driver circuit comprising two n-p-n transistors $Q_4$ and $Q_5$ connected as a darlington pair with the emitter of the transistor $Q_5$ grounded to terminal 23, the emitter of the transistor $Q_4$ connected to the base of the transistor $Q_5$, and the collectors of the transistors $Q_4$ and $Q_5$ connected together and by a resistor $R_{16}$ to the output terminal 30 of the warning circuit. The warning lamp 31 is connected between the terminal 30 and the battery terminal 18. The base of the transistor $Q_4$ is connected by a resistor $R_{17}$ to the ground terminal 23 and by a resistor $R_{18}$ to the collector of the transistor $Q_3$. When the latch circuit is operated the collector of the transistor $Q_3$ supplies base current for transistor $Q_4$ and both transistors $Q_4$ and $Q_5$ draw current through the lamp 31.

A lamp test circuit is also provided to supply base current to the transistor $Q_4$ for a short time when the warning circuit is first connected to the power supply. This test circuit includes two n-p-n transistors $Q_6$ and $Q_7$ which have their collectors connected to the rail 24. The emitter of the transistor $Q_6$ is connected to the base of the transistor $Q_7$ and the emitter of the transistor $Q_7$ is connected by a resistor $R_{19}$ to the base of the transistor $Q_4$. The base of the transistor $Q_6$ is connected by a capacitor $C_2$ to the rail 24 and by a diode $D_{12}$ (with its cathode connected to the base of the transistor $Q_6$) to the emitter of the transistor $Q_7$. The transistors $Q_6$ and $Q_7$ form a compound emitter follower which uses the transient current caused when the supply is connected to the circuit and charges the capacitor $C_2$ via transistors $Q_6$, $Q_7$ and transistors $Q_4$, $Q_5$ in cascade. The charge current is very small so that a small value capacitor $C_2$ will give a long lasting transient to light the lamp 31 for a period long enough for the user to be able to verify that the lamp is operative.

Diodes $D_{13}$, $D_{15}$ have their cathodes connected to the rail 25 and their anodes connected to the collectors of transistors $Q_1$, $Q_5$ respectively. Diodes $D_{13}$, $D_{15}$ thus co-operate with zener diode $D_1$ to prevent high voltage transients from being applied to transistors $Q_1$, $Q_5$. Diode $D_{14}$ has its anode connected to the terminal 23 and its cathode connected to the anode of diode $D_{13}$. Diodes $D_1$, $D_{14}$ thus co-operate to protect the circuit against damage arising from misconnection of the terminals 22, 23, with reversed polarity. If reversed connections to the power supply are made, current will flow through diodes $D_{13}$, $D_{14}$ and resistor $R_1$, thus limiting the reverse voltage across the transistor $Q_1$ to the forward breakdown voltage of the diode $D_{14}$.

In the event that both of the lamps 27, 28 become open circuit, the resultant drop in current through resistor $R_2$ causes a rise in the collector voltage of transistor $Q_1$ (provided that the latter is non-conductive), and the lamp 31 lights, as previously described.

Figure 2:
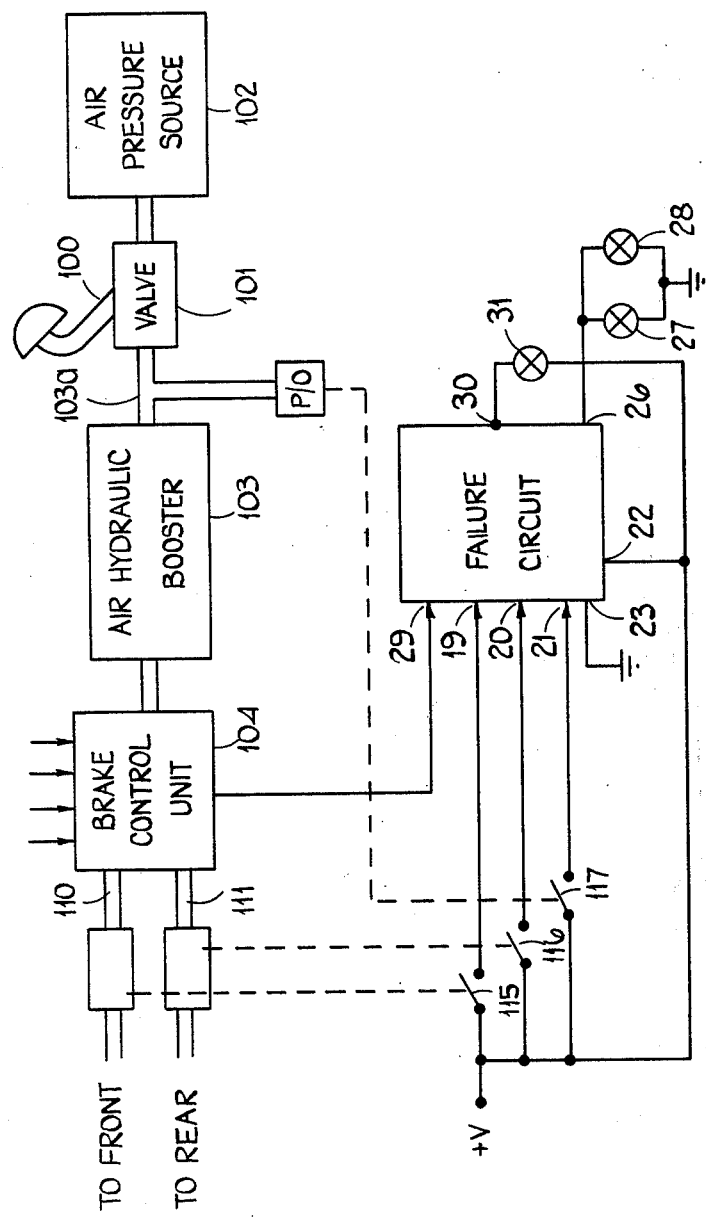
FIG. 2 is a diagram illustrating the application of the circuit to an air/hydraulic system.

Turning now to FIG. 2 the system in this case is an air/hydraulic system of known type in which the brake lever 100 operates a valve 101 which admits air from an air pressure source 102 via an air pressure line 103a to air/hydraulic booster units 103 hydraulic fluid from which is applied to the brake control unit 104 having separate front and rear brake hydraulic fluid outlets, 110 and 111. Pressure switches 115, 116 are operated by these outlets and correspond to the pressure switches 15 and 16 of FIG. 1. The pressure switch 17 of FIG. 1 is replaced by a switch 117 which senses the air pressure applied to the booster unit 104. The failure circuit operates in the same manner as that described in relation to FIG. 1.

I claim:

1. A brake pressure failure warning circuit for use in a multi-line brake system comprising a plurality of pressure switches sensitive to the fluid pressures in the respective pressure lines and each actuable when the fluid pressure in the associated line attains a predetermined level, a detecting circuit connected to said switches and arranged to produce an output signal when any one of said switches is actuated, a muting circuit also connected to said switches and arranged to prevent the detecting circuit from producing its output signal when all of the switches are actuated and warning means operable by said output signal, the detecting circuit including a transistor having a collector, base and emitter with its collector connected to a supply via said switches in series respectively with a plurality of diodes and a common resistor, the muting circuit being connected to the base of the transistor so as to render the transistor conductive when muting is required, the muting circuit including a plurality of diodes and a comparable number of resistors coupled with the cathodes of the respective diodes, the anode of the respective diodes being connected with a first resistor and a second resistor which is in turn coupled with a third resistor.

2. A circuit as claimed in claim 1 in which said warning means includes a latch circuit such that after receipt of said output signal the warning means can only be prevented from operating by disconnection thereof from its power supply.

3. A circuit as claimed in claim 1 in which the warning means includes a delay circuit to prevent operation of the warning means by short duration output signals which may occur, for example, as a result of the fluid pressure in the various lines reaching said predetermined level at different instants after operation of the brakes.

4. A circuit as claimed in claim 1 in which the muting circuit has an input terminal for connection to a wheel slip control device to prevent the detector circuit producing an output whenever said control device is brought into operation.

5. A circuit as claimed in claim 1 in which the collector of said transistor is connected to a latch circuit which operates with regenerative switching action when a signal is impressed on said transistor via said diodes when the transistor is non-conductive.

6. A circuit as claimed in claim 5 in which the connection between the collector of said transistor and the latch circuit is an R.C. delay circuit.

7. A circuit as claimed in claim 1 including brake warning lamps connected in parallel with the series combination of said resistor and said transistor.

8. A circuit as claimed in claim 7 including a further resistor connecting said common resistor to a supply rail so that current normally flows through said further resistor and the lamps (insufficient to light the lamps) to hold the connection of said common resistor and the diodes at a low level, failure of said lamps to open circuit causing the potential on the collector of said transistor to rise and operate said warning means.

9. A vehicle braking system including a plurality of hydraulic brake pressure lines independently supplied under the control of a non-skid braking control and a failure warning circuit as claim in claim 1.

10. A vehicle braking system including a control valve controlling admission of compressed air to an air/hydraulic booster unit via an air pressure line, means connecting said booster unit to a plurality of separate hydraulic brake pressure lines and a failure warning circuit as claimed in claim 1, the switches of said circuit being operated by the air pressure line and said brake pressure lines respectively.

* * * * *